US010363610B2

(12) United States Patent
Liu et al.

(10) Patent No.: US 10,363,610 B2
(45) Date of Patent: Jul. 30, 2019

(54) WHEEL BOLT HOLE CHAMFER DEVICE

(71) Applicant: CITIC Dicastal CO., LTD., Qinhuangdao, Hebei (CN)

(72) Inventors: Huiying Liu, Qinhuangdao (CN); Yule Zhou, Qinhuangdao (CN)

(73) Assignee: CITIC Dicastal CO., LTD., Qinhuangdao Hebei (CN)

( * ) Notice: Subject to any disclaimer, the term of this patent is extended or adjusted under 35 U.S.C. 154(b) by 0 days.

(21) Appl. No.: 15/894,068

(22) Filed: Feb. 12, 2018

(65) Prior Publication Data
US 2019/0193169 A1 Jun. 27, 2019

(30) Foreign Application Priority Data

Dec. 22, 2017 (CN) .......................... 2017 1 1402902

(51) Int. Cl.
| | | |
|---|---|---|
| *B23B 39/16* | (2006.01) | |
| *B23B 41/00* | (2006.01) | |
| *B23B 39/00* | (2006.01) | |
| *B23Q 5/22* | (2006.01) | |

(52) U.S. Cl.
CPC ............ *B23B 41/00* (2013.01); *B23B 39/003* (2013.01); *B23B 39/168* (2013.01); *B23Q 5/22* (2013.01); *B23B 39/161* (2013.01); *B23B 2215/08* (2013.01); *B23B 2220/04* (2013.01); *B23Q 2220/004* (2013.01); *B23Q 2705/10* (2013.01)

(58) Field of Classification Search
CPC ... B23B 2215/08; B23B 39/161; B23B 39/20; B23B 41/00; B23B 39/003; Y10T 408/385; Y10T 408/3811; Y10T 408/66; Y10T 408/52; B23Q 5/04; B23Q 5/048; B23Q 5/16; B23Q 2705/12
See application file for complete search history.

(56) References Cited

FOREIGN PATENT DOCUMENTS

| | | |
|---|---|---|
| CN | 202964335 U | 6/2013 |
| CN | 204159913 U | 2/2015 |
| CN | 106840069 A | 6/2017 |
| CN | 206464606 U | 9/2017 |
| CN | 107283000 A | 10/2017 |
| CN | 107297655 A | 10/2017 |
| CN | 207615787 U | 7/2018 |
| KR | 20050083142 A | 8/2005 |

*Primary Examiner* — Sunil K Singh
*Assistant Examiner* — Paul M Janeski
(74) *Attorney, Agent, or Firm* — Cooper Legal Group, LLC

(57) ABSTRACT

A wheel bolt hole chamfer device is composed of a base, a support frame, a lower servo motor, a turntable, stop blocks, guide rails, strong springs, a driving friction wheel, driven shafts, driven friction wheels, chamfer cutters and the like. The device can be put into a production line as a fourth-procedure machining device, and bolt hole chamfers are no longer machined in three procedures, so that the three-procedure machining time is reduced; and after the fourth procedure for machining the bolt hole chamfers is supplemented, the machining time of a single wheel is shortened, and the efficiency is improved. The device integrates pitch diameter adjustment and rotating drive of the chamfer cutters, so that a drive system and a power system are greatly simplified, i.e., the manufacturing cost of the device is reduced, all bolt hole chamfers can be machined at the same time.

1 Claim, 4 Drawing Sheets

WHEEL BOLT HOLE CHAMFER DEVICE

CROSS-REFERENCE TO RELATED APPLICATIONS

The present application claims benefit of Chinese Patent Application No. 201711402902.8, filed on Dec. 22, 2017, the contents of which are hereby incorporated by reference in its entirety.

BACKGROUND

At present, wheel machining is mainly completed by first turning, second turning and third center drilling. The machining of the four parts, bolt holes, a valve hole, bolt hole chamfers and a valve hole pit, are completed in the three procedures, and a plurality of bolt holes need to be machined one by one, so the third center drilling time is longest, in which the third center drilling time determines the time of single wheel production. In practical production, how to furthest improve the production efficiency, reduce the machining time of a single part and reduce the machining cost are problems to be solved urgently. This patent provides a wheel bolt hole chamfer device on the basis of the current situation, this device is put into a production line as a fourth-procedure machining device, and the bolt hole chamfers are no longer machined in the three procedures, so that the three-procedure machining time is reduced; and after the fourth procedure for machining the bolt hole chamfers is supplemented, the machining time of the single wheel is shortened, and the efficiency is improved. This device can be used for machining all the bolt hole chamfers, and compared with one-by-one machining in a machining center, the production efficiency is greatly improved and the machining time of the single wheel is reduced.

SUMMARY

The disclosure relates to the technical field of wheel bolt hole chamfer machining, and specifically, to a device for automatically machining bolt hole chamfers.

The aim of the disclosure is to provide a wheel bolt hole chamfer device, which can be used for automatic continuous production.

In order to fulfill the above aim, the technical solution of the disclosure is:

A wheel bolt hole chamfer device is composed of a base, a support frame, a lower servo motor, a first shaft, bearing seats, a turntable, stop blocks, guide rails, strong springs, sliding blocks, a cylinder, a guide post, a lifting table, an upper servo motor, a second shaft, a driving friction wheel, driven shafts, driven friction wheels, chamfer cutters, a left feeding cylinder, a right feeding cylinder, vertical guide posts, a feeding platform, corner cylinder pressure claws, axial positioning blocks and radial positioning blocks.

The wheel bolt hole chamfer device is composed of a chamfer cutter system and a wheel positioning, clamping and feeding system. The chamfer cutter system completes pitch diameter adjustment, position adjustment and rotation of the chamfer cutters; and the wheel positioning, clamping and feeding system completes positioning, clamping and feeding machining of a wheel.

The support frame is mounted in the center of the bottom of the base, the lower servo motor is mounted on the support frame, the output end of the lower servo motor is connected with the first shaft, the turntable is mounted on the first shaft, and the rotation of the turntable can be controlled by the lower servo motor. The five stop blocks and the five pairs of guide rails are uniformly distributed about the center of the turntable, the stop blocks and the guide rails are all fixed on the turntable, the five sliding blocks are respectively mounted on the five pairs of guide rails, and the sliding blocks are connected with the stop blocks via the strong springs. The cylinder and the guide post are fixedly mounted in the center of the turntable, the output end of the cylinder is connected with the lifting table to control up-down motion of the lifting table, the upper servo motor is fixed on the lifting table, the output end of the upper servo motor is connected with the second shaft, and the driving friction wheel is conical and mounted on the second shaft. A driven shaft is mounted on each sliding block, a driven friction wheel is mounted on the driven shaft, the driven friction wheels are inversely conical and matched with the driving friction wheel, and a chamfer cutter is mounted at the top of each driven shaft. The cylinder drives the lifting table to move up, the driving friction wheel can be driven to move up, and the pitch diameters of the chamfer cutters can be adjusted via taper fit of the driving friction wheel and the driven friction wheels, so that the device can be applied to a wheel having different pitch diameters. The upper servo motor is started to drive the driving friction wheel to rotate, and the chamfer cutters can rotate via fit of the driving friction wheel and the driven friction wheels. This structure integrates pitch diameter adjustment and rotating drive of the chamfer cutters, so that the pitch diameters can be adjusted, the chamfer cutters can rotate, and a drive system and a power system are greatly simplified. The wheel is put on the feeding platform by a manipulator, the valve hole is located at a fixed position, the lower servo motor can drive the turntable to rotate to adjust the positions of the five chamfer cutters in the circumferential direction, and the chamfer cutters are adjusted to be opposite to bolt holes according to the included angles between the valve hole and the bolt holes. By adjusting the positions of the chamfer cutters in the circumferential direction, when the included angles between the valve hole and the bolt holes are changed, the device still can be used, so the universality is very strong, and this is the chamfer cutter system.

The four vertical guide posts are mounted at the four corners of the bottom of the base, the left feeding cylinder and the right feeding cylinder are symmetrically mounted at the top of the base, the output ends of the left feeding cylinder and the right feeding cylinder are connected to the feeding platform, the feeding platform is matched with the vertical guide posts via guide sleeves, and under the guiding action of the vertical guide posts, the left feeding cylinder and the right feeding cylinder can drive the feeding platform to move up and down. Three axial positioning blocks for axial positioning of the wheel, three radial positioning blocks for radial positioning of the wheel and three corner cylinder pressure claws for clamping of the wheel are mounted on the feeding platform every 120 degrees, and a circular opening for reserving enough space for the chamfer cutters is formed in the center of the feeding platform. After first turning, second turning and center drilling are completed on the wheel, the wheel is taken out from the machining center and then put on the feeding platform by the manipulator; after axial positioning and radial positioning, the corner cylinder pressure claws are started to clamp the wheel; next, the left feeding cylinder and the right feeding cylinder are simultaneously started to drive the feeding platform to descend, thus realizing feeding of the wheel. This is the wheel positioning, clamping and feeding system.

The working process of the wheel bolt hole chamfer device is: firstly, this device is put into a production line as a fourth-procedure machining device, and according to the produced wheel, the circumferential positions and pitch diameters of the chamfer cutters are adjusted to match the wheel. After machining is completed in the machining center, the wheel is transferred from the machining center to the feeding platform by the manipulator, the wheel is positioned and clamped via the axial positioning blocks, the radial positioning blocks and the corner cylinder pressure claws, next, the left feeding cylinder and the right feeding cylinder are simultaneously started to drive the feeding platform to descend, i.e., to drive the wheel to be fed downward, and all bolt hole chamfers can be machined at one time under the cooperation of the rotating chamfer cutters.

The disclosure can be put into a production line as a fourth-procedure machining device, and bolt hole chamfers are no longer machined in the three procedures, so that the three-procedure machining time is reduced; and after the fourth procedure for machining the bolt hole chamfers is supplemented, the machining time of the single wheel is shortened, and the efficiency is improved. This device integrates pitch diameter adjustment and rotating drive of the chamfer cutters, so that a drive system and a power system are greatly simplified, the manufacturing cost of the device is reduced, all bolt hole chamfers can be machined at the same time, and compared with one-by-one machining in the machining center, the production efficiency is greatly improved. Moreover, this device can be applied to bolt hole chamfers of a wheel having different pitch diameters and different bolt hole positions, and when the number of the bolt holes is changed, the corresponding chamfer cutter system is changed, so the device is advanced, novel in structure, accurate, high in efficiency and strong in universality.

Figure 1:
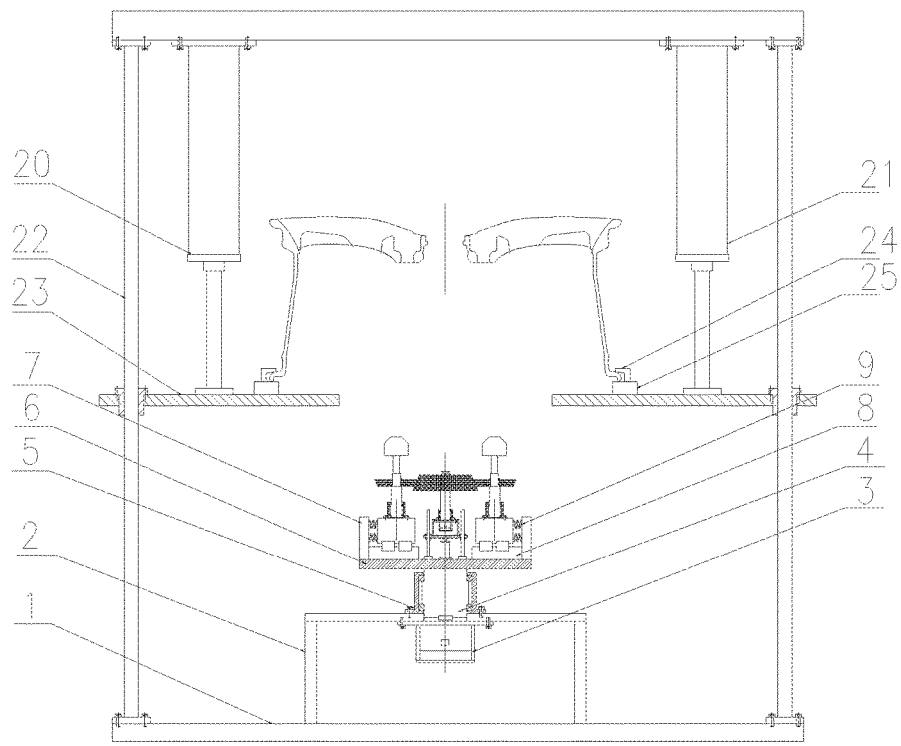
FIG. 1 is a front view of a wheel bolt hole chamfer device of the disclosure.
Figure 2:
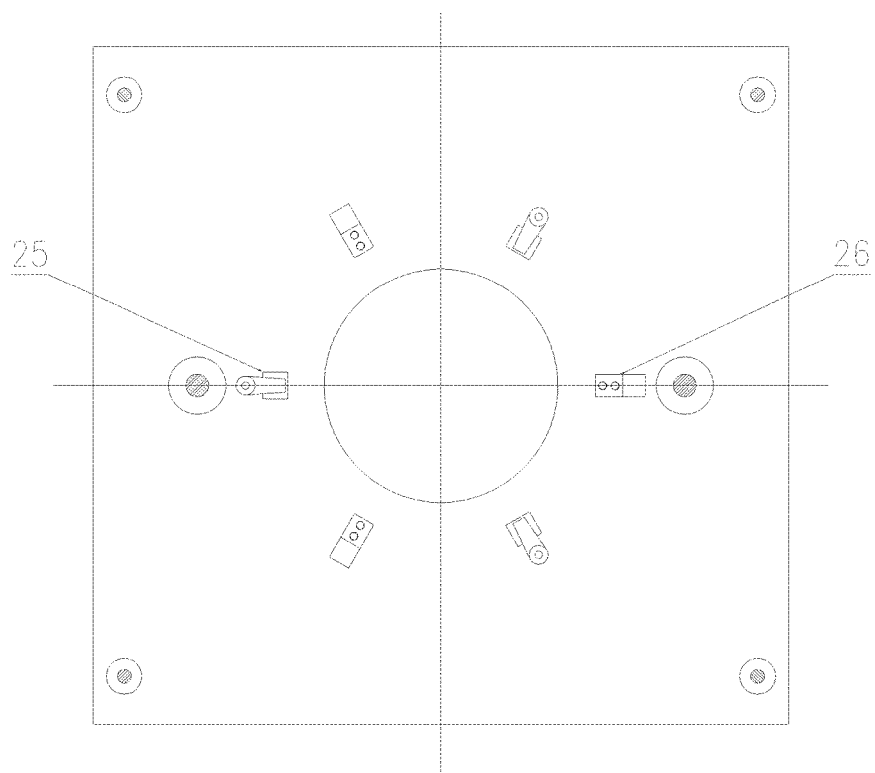
FIG. 2 is a top view of the wheel bolt hole chamfer device of the disclosure.
Figure 3:
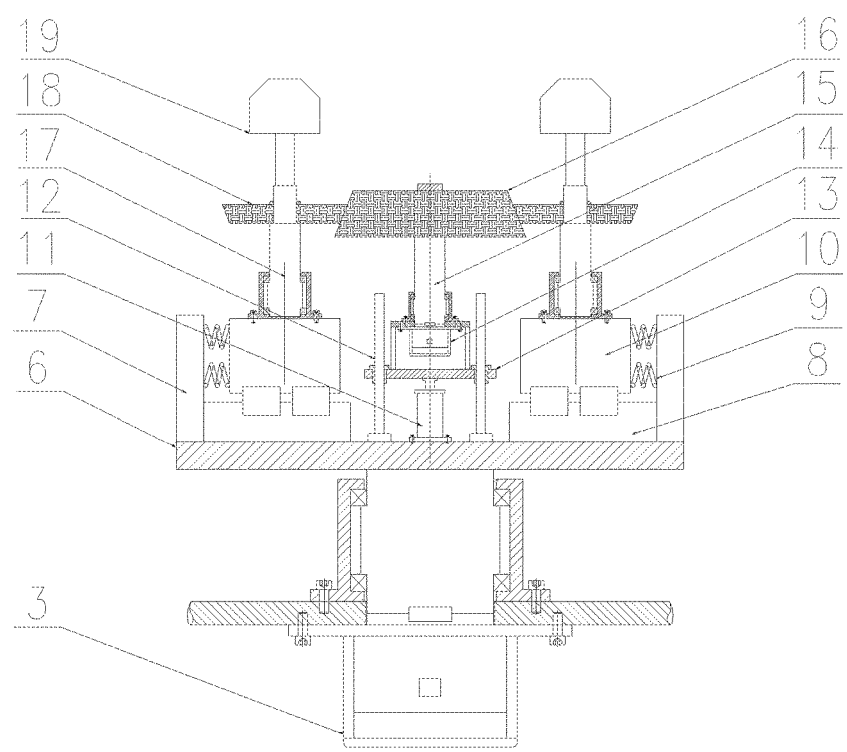
FIG. 3 is an enlarged front view of a chamfer cutter system of the wheel bolt hole chamfer device of the disclosure.
Figure 4:
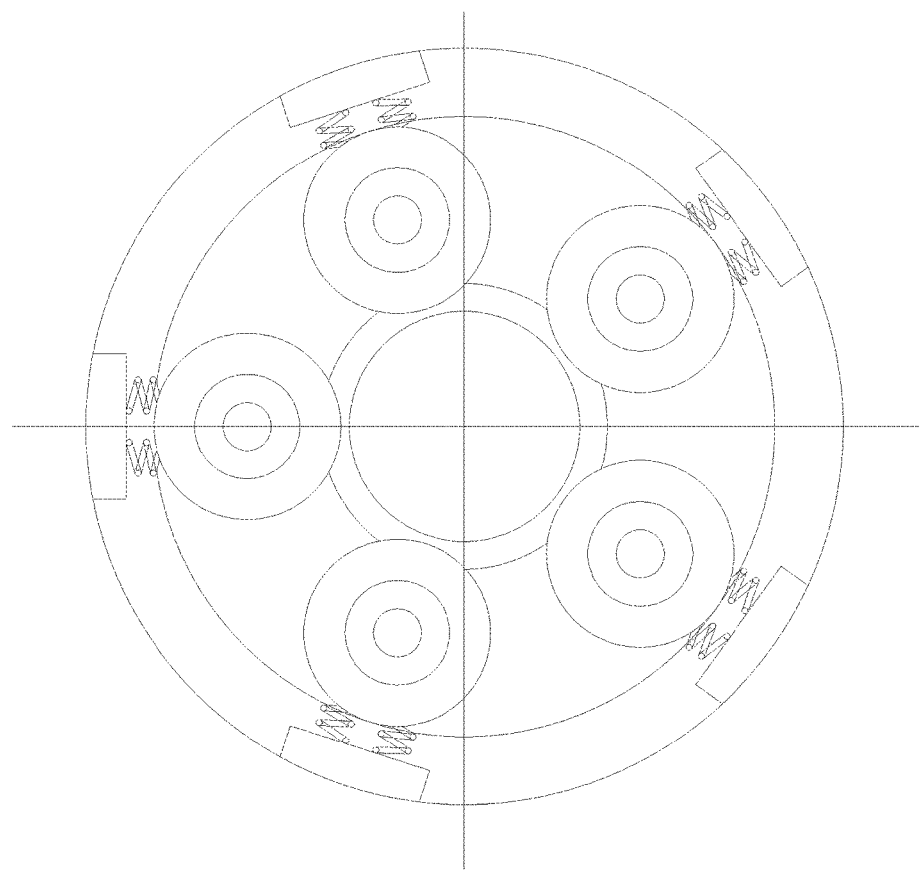
FIG. 4 is an enlarged top view of the chamfer cutter system of the wheel bolt hole chamfer device of the disclosure.

LIST OF REFERENCE SYMBOLS 1 base
2 support frame
3 lower servo motor
4 first shaft
5 bearing seat
6 turntable
7 stop block
8 guide rail
9 strong spring
10 sliding block
11 cylinder
12 guide post
13 lifting table
14 upper servo motor
15 second shaft
16 driving friction wheel
17 driven shaft
18 driven friction wheel
19 chamfer cutter
20 left feeding cylinder
21 right feeding cylinder
22 vertical guide post
23 feeding platform
24 corner cylinder pressure claw
25 axial positioning block
26 radial positioning block

DETAILED DESCRIPTION

Specific details and working conditions of a device provided by the disclosure will be described below in combination with the accompanying drawings.

A wheel bolt hole chamfer device is composed of a base 1, a support frame 2, a lower servo motor 3, a first shaft 4, bearing seats 5, a turntable 6, stop blocks 7, guide rails 8, strong springs 9, sliding blocks 10, a cylinder 11, a guide post 12, a lifting table 13, an upper servo motor 14, a second shaft 15, a driving friction wheel 16, driven shafts 17, driven friction wheels 18, chamfer cutters 19, a left feeding cylinder 20, a right feeding cylinder 21, vertical guide posts 22, a feeding platform 23, corner cylinder pressure claws 24, axial positioning blocks 25 and radial positioning blocks 26.

The wheel bolt hole chamfer device is composed of a chamfer cutter system and a wheel positioning, clamping and feeding system. The chamfer cutter system completes pitch diameter adjustment, position adjustment and rotation of the chamfer cutters; and the wheel positioning, clamping and feeding system completes positioning, clamping and feeding machining of a wheel.

The support frame 2 is mounted in the center of the bottom of the base 1, the lower servo motor 3 is mounted on the support frame 2, the output end of the lower servo motor 3 is connected with the first shaft 4, the turntable 6 is mounted on the first shaft 4, and the rotation of the turntable 6 can be controlled by the lower servo motor 3. The five stop blocks 7 and the five pairs of guide rails 8 are uniformly distributed about the center of the turntable 6, the stop blocks 7 and the guide rails 8 are all fixed on the turntable 6, the five sliding blocks 10 are respectively mounted on the five pairs of guide rails 8, and the sliding blocks 10 are connected with the stop blocks 7 via the strong springs 9. The cylinder 11 and the guide post 12 are fixedly mounted in the center of the turntable 6, the output end of the cylinder 11 is connected with the lifting table 13 to control up-down motion of the lifting table 13, the upper servo motor 14 is fixed on the lifting table 13, the output end of the upper servo motor 14 is connected with the second shaft 15, and the driving friction wheel 16 is conical and mounted on the second shaft 15. A driven shaft 17 is mounted on each sliding block 10, a driven friction wheel 18 is mounted on the driven shaft 17, the driven friction wheels 18 are inversely conical and matched with the driving friction wheel 16, and a chamfer cutter 19 is mounted at the top of each driven shaft 17. The cylinder 11 drives the lifting table 13 to move up, the driving friction wheel 16 can be driven to move up, and the pitch diameters of the chamfer cutters 19 can be adjusted via taper fit of the driving friction wheel 16 and the driven friction wheels 18, so that the device can be applied to a wheel having different pitch diameters. The upper servo motor 14 is started to drive the driving friction wheel 16 to rotate, and the chamfer cutters 19 can rotate via fit of the driving friction wheel 16 and the driven friction wheels 18.

This structure integrates pitch diameter adjustment and rotating drive of the chamfer cutters 19, so that the pitch diameters can be adjusted, the chamfer cutters can rotate, and a drive system and a power system are greatly simplified. The wheel is put on the feeding platform 23 by a manipulator, the valve hole is located at a fixed position, the lower servo motor 3 can drive the turntable 6 to rotate to adjust the positions of the five chamfer cutters 19 in the circumferential direction, and the chamfer cutters 19 are adjusted to be opposite to bolt holes according to the included angles between the valve hole and the bolt holes. By adjusting the positions of the chamfer cutters in the circumferential direction, when the included angles between the valve hole and the bolt holes are changed, the device still can be used, so the universality is very strong, and this is the chamfer cutter system.

The four vertical guide posts 22 are mounted at the four corners of the bottom of the base 1, the left feeding cylinder 20 and the right feeding cylinder 21 are symmetrically mounted at the top of the base 1, the output ends of the left feeding cylinder 20 and the right feeding cylinder 21 are connected to the feeding platform 23, the feeding platform 23 is matched with the vertical guide posts 22 via guide sleeves, and under the guiding action of the vertical guide posts 22, the left feeding cylinder 20 and the right feeding cylinder 21 can drive the feeding platform 23 to move up and down. Three axial positioning blocks 25 for axial positioning of the wheel, three radial positioning blocks 26 for radial positioning of the wheel and three corner cylinder pressure claws 24 for clamping of the wheel are mounted on the feeding platform 23 every 120 degrees, and a circular opening for reserving enough space for the chamfer cutters is formed in the center of the feeding platform 23. After first turning, second turning and center drilling are completed on the wheel, the wheel is taken out from the machining center and then put on the feeding platform 23 by the manipulator; after axial positioning and radial positioning, the corner cylinder pressure claws 24 are started to clamp the wheel; next, the left feeding cylinder 20 and the right feeding cylinder 21 are simultaneously started to drive the feeding platform 23 to descend, thus realizing feeding of the wheel. This is the wheel positioning, clamping and feeding system.

The working process of the wheel bolt hole chamfer device is: firstly, this device is put into a production line as a fourth-procedure machining device, and according to the produced wheel, the circumferential positions and pitch diameters of the chamfer cutters 19 are adjusted to match the wheel. After machining is completed in the machining center, the wheel is transferred from the machining center to the feeding platform 23 by the manipulator, the wheel is positioned and clamped via the axial positioning blocks 25, the radial positioning blocks 26 and the corner cylinder pressure claws 24, next, the left feeding cylinder 20 and the right feeding cylinder 21 are simultaneously started to drive the feeding platform 23 to descend, i.e., to drive the wheel to be fed downward, and all bolt hole chamfers can be machined at one time under the cooperation of the rotating chamfer cutters 19.

The disclosure can be put into a production line as a fourth-procedure machining device, and bolt hole chamfers are no longer machined in the three procedures, so that the three-procedure machining time is reduced; and after the fourth procedure for machining the bolt hole chamfers is supplemented, the machining time of the single wheel is shortened, and the efficiency is improved. This device integrates pitch diameter adjustment and rotating drive of the chamfer cutters, so that a drive system and a power system are greatly simplified, the manufacturing cost of the device is reduced, all bolt hole chamfers can be machined at the same time, and compared with one-by-one machining in the machining center, the production efficiency is greatly improved. Moreover, this device can be applied to bolt hole chamfers of a wheel having different pitch diameters and different bolt hole positions, and when the number of the bolt holes is changed, the corresponding chamfer cutter system is changed, so the device is advanced, novel in structure, accurate, high in efficiency and strong in universality.

The invention claimed is:

1. A wheel bolt hole chamfer device, being composed of a base, a support frame, a lower servo motor, a first shaft, bearing seats, a turntable, five stop blocks, five pairs of guide rails, strong springs, five sliding blocks, a cylinder, a guide post, a lifting table, an upper servo motor, a second shaft, a driving friction wheel, driven shafts, driven friction wheels, chamfer cutters, a left feeding cylinder, a right feeding cylinder, vertical guide posts, a feeding platform, corner cylinder pressure claws, axial positioning blocks and radial positioning blocks;

wherein:

the five stop blocks and the five pairs of guide rails are uniformly distributed about a center of the turntable, the five stop blocks and the five pairs of guide rails being all fixed on the turntable, the five sliding blocks being respectively mounted on the five pairs of guide rails, and the five sliding blocks being connected with the five stop blocks via the strong springs;

the cylinder and the guide post being fixedly mounted in the center of the turntable, an output end of the cylinder being connected with the lifting table to control up-down motion of the lifting table, the upper servo motor being fixed on the lifting table, an output end of the upper servo motor being connected with the second shaft, and the driving friction wheel being conical and mounted on the second shaft; a driven shaft of the driven shafts being mounted on each sliding block of the five sliding blocks, a driven friction wheel of the driven friction wheels being mounted on the driven shaft, the driven friction wheels being inversely conical and matched with the driving friction wheel, and a chamfer cutter of the chamfer cutters being mounted at a top of each driven shaft of the driven shafts;

the cylinder driving the lifting table to move up, the driving friction wheel being able to be driven to move up, and pitch diameters of the chamfer cutters being able to be adjusted via taper fit of the driving friction wheel and the driven friction wheels; the upper servo motor being started to drive the driving friction wheel to rotate, and the chamfer cutters being able to rotate via fit of the driving friction wheel and the driven friction wheels; and the pitch diameter adjustment and the rotating drive of the chamfer cutters being integrated.

* * * * *